CHECKING SYSTEM FOR RECORDING MACHINES

Filed Sept. 25, 1956 5 Sheets-Sheet 1

INVENTOR
Marion P. Shorb
BY
Curtis Morris + Safford
ATTORNEYS

Sept. 2, 1958 M. P. SHORB 2,850,580

CHECKING SYSTEM FOR RECORDING MACHINES

Filed Sept. 25, 1956

5 Sheets-Sheet 2

INVENTOR
Marion P. Shorb
BY
Curtis, Morris & Safford
ATTORNEYS

Sept. 2, 1958

M. P. SHORB 2,850,580

CHECKING SYSTEM FOR RECORDING MACHINES

Filed Sept. 25, 1956

5 Sheets-Sheet 3

INVENTOR
Marion P. Shorb
BY
Curtis, Morris & Safford
ATTORNEYS

INVENTOR
*Marion P. Shorb*
BY
*Curtis, Morris & Safford*
ATTORNEYS

INVENTOR
Marion P. Shorb
BY
Curtis, Morris & Safford
ATTORNEYS 2,850,580

CHECKING SYSTEM FOR RECORDING MACHINES

Marion P. Shorb, Fairfield, Conn., assignor to Dictaphone Corporation, Bridgeport, Conn., a corporation of New York Application September 25, 1956, Serial No. 611,827
25 Claims. (Cl. 179—100.1)

This invention relates to apparatus for checking the operability of recording equipment such as magnetic tape sound recorders. More particularly, this invention concerns means for automatically making a momentary but complete spot check, e. g. every time the sound recording equipment is actuated for the purpose of making a recording, and for providing a warning signal if either the recording equipment or the checking system is not functioning properly at the time of such spot check.

For recording machines used in certain applications, it is extremely important to the user that the equipment be operative whenever recording commences. For example, it frequently is desired to monitor and record radio communications between an aircraft and a control station, e. g. while the aircraft is coming in for a landing, etc. A complete and intelligible record of such communications may be of considerable value in the event of an accident to the aircraft since the recorded conversations can indicate or provide clues to the cause of the accident and thus subsequently lead to corrective measures for avoiding similar accidents in the future.

Recording machines fail or function improperly for any of a large variety of reasons, e. g. there may be a vacuum tube failure in the recorder amplifier, or the amplifier power supply may go out, or the motor driving the record medium by the recording head may stop operating or perhaps drive the record at an incorrect speed. To be fully effective, the checking apparatus used to determine whether the recording equipment is operative should be arranged to indicate failure regardless of the cause. Furthermore, the checking system should be "self-checking," that is, the system should provide a warning irrespective of whether the failure is in the recording equipment proper or in the checking apparatus. The checking system should of course be as simple and foolproof as possible to minimize the chances of its own failure.

In a preferred embodiment of the present invention, to be described hereinbelow in more detail, a checking system is arranged for use with a magnetic tape recorder of the type having four separate sound channels, wherein the signals in each channel are recorded in four respective side-by-side tracks extending longitudinally of the tape. Magnetic impressions are made on these tracks by four corresponding recording heads which are spaced-apart laterally across the tape and also are spaced-apart longitudinally of the tape. The complete recorder is checked by feeding a single tone pulse of short duration simultaneously to all four channels and subsequently detecting and analyzing the four tone impressions placed on the magnetic tape. The checking operation is completed in about 4.5 seconds. If the four pulses detected during this period do not meet established requirements as to amplitude, frequency, duration and inter-pulse spacing, the checking system will energize a warning lamp indicating that either the recorder or the checking apparatus is functioning improperly.

Accordingly, it is an object of the present invention to provide checking apparatus for use with sound recording equipment that is superior to such apparatus provided heretofore. It is a further object of this invention to provide checking apparatus adapted automatically to monitor the operation of a recorder at periodic intervals and to indicate whether such recorder or the checking system is functioning properly. Other objects, aspects and advantages of this invention will be in part pointed out in, and in part apparent from, the following description of a preferred embodiment considered together with the accompanying drawings, in which:

Figure 1:
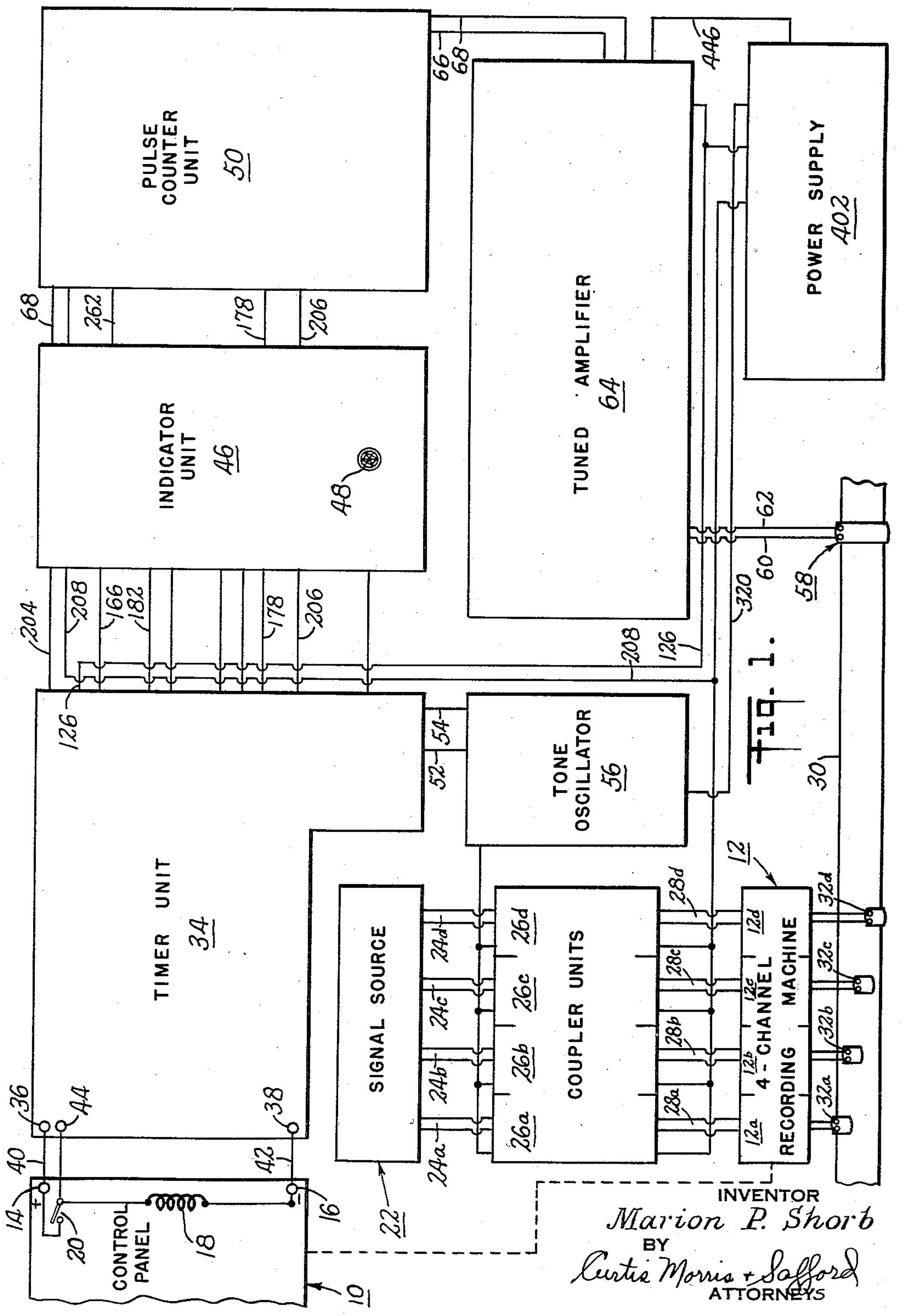
Figure 1 is a block diagram illustrating the overall arrangement of the checking system.

Referring now to the upper left-hand corner of Figure 1, there is shown in dotted outline form a portion of a control panel 10 forming part of a four-channel recording machine, the main operating elements of which are shown in the lower left-hand portion of this drawing in block form at 12. This control panel includes a conventional D.-C. power supply (not shown) having positive and negative output terminals 14 and 16 respectively, and providing an output of 48 volts. Connected between these terminals is a "start" relay 18 in series with an on-off switch 20. When it is desired to record, the switch 20 is closed and the energization of the start relay activates (through conventional means, not shown) the recording machine 12. The on-off switch may be arranged to be operated, for example, when speech signals are received over a radio network or when a radio operator presses the "talk button" on a microphone to commence transmission on a radio network.

When the recording machine 12 is activated, it will begin recording sound signals received from a "signal source" generally indicated by the block 22. These signals are fed from the source 22 through any of four sets of transmission lines **24*a*, 24*b*, 24*c*, 24*d* (e. g. standard telephone cables), through corresponding coupler units indicated in block form at 26*a*, 26*b*, 26*c*, 26*d*, through sets of connecting leads 28*a*, 28*b*, 28*c*, 28*d*, through the separate recording machine channels 12*a*, 12*b*, 12*c*, 12*d*, and are impressed on a moving tape 30 of magnetizable material by corresponding recorder heads 32*a*, 32*b*, 32*c*, 32*d***.

Shown to the right of the control panel 10 is a timer unit generally indicated in block form at 34 and forming part of the system for automatically checking the operation of the recording machine 12 each time this machine is activated. The timer unit includes a pair of power terminals 36 and 38 which are supplied with D.-C. voltage by wires 40 and 42 connected to the power supply terminals 14 and 16 associated with the machine panel 10. The timer unit also includes an input terminal 44 which is connected to the on-off switch 20 in such a manner that positive voltage is applied to this terminal whenever the recording machine is activated.

The application of positive voltage to the timer unit input terminal 44 starts the checking system which thereupon automatically makes a complete test of the operability of the recording machine 12. For this purpose, the timer unit 34 develops a timing pulse of approximately 4.5 seconds duration (as will be explained in more detail below) which is transmitted to an indicator unit (shown to the right in block form at 46) to activate this unit and at the same time to prevent the energization of a warning lamp 48 in this unit for the duration of the timing pulse. As explained below, if the recording equipment is operating properly the indicator unit 46 will receive, during the period of this timing pulse, a "safe" signal from a pulse counter unit generally indicated to the right in block form at 50. In this event, the warning lamp 48 in the indicator unit will remain deenergized at the end of the timing pulse, thus indicating that the equipment is operating properly. However, should there be any malfunction in the equipment, there will be no "safe" signal from the pulse counter unit during the timing pulse, and at the end of this pulse the warning lamp will be energized to indicate equipment failure.

Returning now to the timer unit 34, when this unit is activated by closure of the on-off switch 20 it also initiates a tone-start signal which is transmitted down along leads 52 and 54 to a tone pulse oscillator generally indicated in block form at 56. This oscillator, in turn, generates a short tone pulse (approximately 0.5 second duration) having a frequency of 2500 cycles per second, and which is fed through the coupler units 26*a*, 26*b*, 26*c*, 26*d*, through the corresponding separate channels 12*a*, 12*b*, 12*c*, 12*d* of the recording machine 12, to the respective recording heads 32*a*, 32*b*, 32*c*, 32*d*. The audio-frequency tone pulse consequently is recorded simultaneously on the four respective tracks of the magnetic tape 30.

Movement of the magnetic tape 30 carries it to the right by a magnetic pick-up head diagrammatically indicated at 58 and which extends across the full width of the tape to sense magnetic impressions placed on any of the separate sound tracks. Since the recording heads 32*a*, 32*b*, 32*c*, 32*d* are evenly spaced-apart longitudinally of the tape, the audio-frequency pulses impressed on the tape are sensed sequentially by the pick-up head, i. e. the pick-up head develops a series of four equally spaced-apart electrical pulses. These latter pulses, in turn, are transmitted along a pair of wires 60 and 62 to the input circuit of a tuned amplifier generally indicated in block form at 64.

The amplifier 64 is tuned to the same audio frequency as the tone pulse oscillator 56 and is arranged to produce D.-C. output pulses corresponding to the four pulses sensed by the pick-up head 58. These D.-C. pulses form a check signal which is transmitted from the amplifier output circuit along a pair of wires 66 and 68 to the pulse counter unit 50. If the recording machine and checking system are operating properly, i. e. if exactly four pulses of the proper time duration and inter-pulse spacing are transmitted to the pulse counter unit, the pulse counter will in turn transmit the "safe" signal, referred to above, to the indicator unit 46 so that the warning lamp 48 will remain deenergized at the end of the 4.5 second timing pulse.

Figure 2:
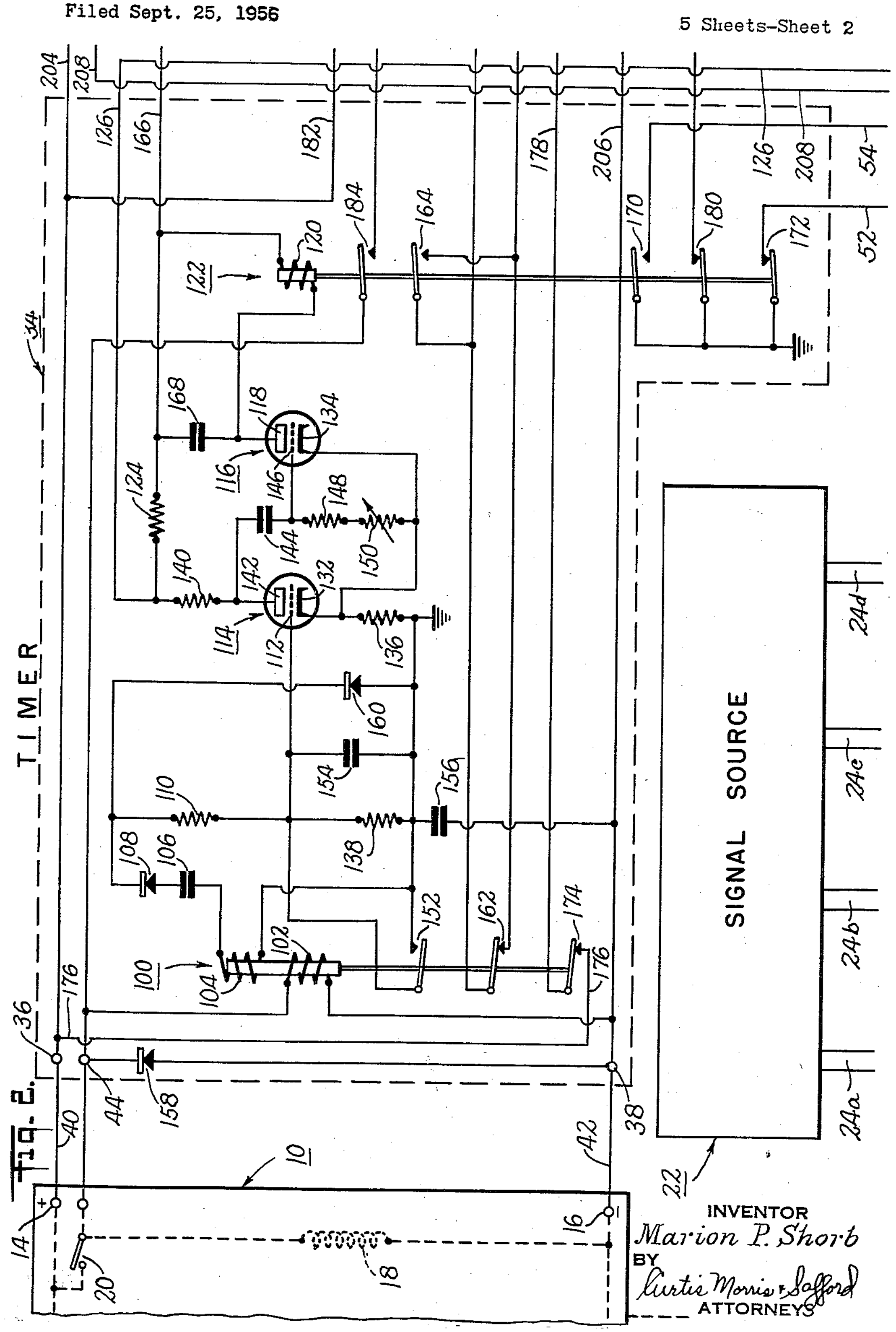
Figure 2 is a schematic diagram showing the circuit of the Timer Unit illustrated in block form in Figure 1.

Turning now to the details of the system, and referring particularly to the upper left-hand portion of Figure 2, closure of the on-off switch 20 energizes a check control relay generally indicated at 100, the energizing current flowing from the input terminal 44 through the relay winding 102 to the negative power terminal 38. This control relay is provided with a second winding 104 inductively coupled to the first winding 102. When the relay is energized, a positive voltage pulse is transmitted from the upper end of the second relay winding 104, through a coupling capacitor 106, a rectifier 108, and a resistor 110 to the grid 112 of a triode vacuum tube generally indicated at 114; the lower end of this second relay winding is connected to ground to complete the current path.

The triode tube 114 is connected in circuit with a second triode tube, generally indicated at 116, to form a "one-shot" multi-vibrator arranged to produce a timing pulse of approximately 4.5 seconds' duration when a positive voltage pulse is applied to the grid 112 of the first of these tubes 114. The operation of this multi-vibrator circuit is generally as follows: When the recorder checking system is in "standby" condition, i. e. when the power supply circuits all are energized but no voltage is applied to the input terminal 44, plate current flows steadily through the second tube 116. The plate 118 of this latter tube is supplied with energizing potential through the winding 120 of a timing relay generally indicated at 122, a plate load resistor 124, and a positive high voltage lead 126 which (see Figure 5) is connected to one terminal 400 of a rectifier power supply generally indicated at 402. The plate current for the tube 116 maintains the timing relay 122 energized until the multi-vibrator circuit is activated by a positive pulse on the grid 112 of the first tube 114.

The cathodes 132 and 134 of the two tubes 114 and 116 are connected together and also are connected through a common cathode resistor 136 to ground. The plate current of the second tube 116, in flowing through this cathode resistor, produces a substantial voltage drop which, because the grid 112 of the first tube 114 is connected through a resistor 138 directly to ground, biases this first tube beyond its cut-off point so that normally there is no plate current flowing in the first tube. However, when the positive voltage pulse from the second control relay winding 104 is applied to the grid 112, it initiates conduction of plate current in the first tube, the current flowing from the positive high voltage lead 126 through a plate load resistor 140 to the plate 142 of this tube, and from the cathode 132 through the cathode resistor 136 back to ground.

The potential of plate 142 tends to drop due to this conduction through the first tube 114, and this change in potential is coupled through a capacitor 144 to the grid 146 of the second tube 116, thereby reducing the flow of plate current through this second tube. This reduction of plate current, because of the common cathode resistor 136, reduces the bias on the first tube 114 so that this latter tube tends to conduct more heavily thereby still further reducing the potential of its plate 142. Consequently, almost immediately after the positive voltage pulse has been applied to the grid 112 of the first tube 114, the second tube 116 ceases to conduct and the first tube conducts heavily.

The resulting sharp reduction in the potential of the plate 142 of the first tube 114 causes the coupling capacitor 144 to discharge through a path which includes a fixed resistor 148 and an adjustable resistor 150. As this capacitor discharges, the potential of the grid 146 of the second tube 116 rises until ultimately it reaches a point where the tube 116 again commences to conduct. When this point has been reached, the conduction through this latter tube, because of the common cathode resistor 136, tends to increase the bias of the first tube 114 thereby decreasing the conduction of current through this latter tube.

Consequently, the potential of the plate 142 of this tube 114 rises due to the decrease in plate current, and this change in potential is coupled through the capacitor 144 to the grid 146 of the second tube 116 so that conduction through the second tube is further increased. This cycle continues as before, so that almost instantaneously the first tube 114 ceases to conduct and the second tube 116 commences to conduct heavily, as in the original standby condition. The length of time that it takes for the multi-vibrator circuit to return to its original condition is determined by the time constant of the coupling circuit comprising the capacitor 144 and the resistors 148 and 150; these components are selected such that the duration of the timing pulse (i. e. the length of time the timing relay 122 is deenergized) is approximately 4.5 seconds.

The check control relay 100 is provided with a set of contacts 152 which, when the relay is energized, close to short-circuit the grid 112 of tube 114 directly to ground and thereby prevent re-activation of the multi-vibrator after the timing pulse has been initiated. Due to the normal time delay in relay actuation, these relay contacts do not close for a short time (e. g. 5–10 milliseconds) after the on-off switch 20 has been closed so that there is sufficient time for the positive pulse from the relay winding 104 to reach the grid 112 and start the timing pulse prior to the shorting of this grid to ground. A capacitor 154 also is connected between the grid 112 and ground to assist in preventing undesired pulsing of the multi-vibrator; a second capacitor 156 is connected between ground and the negative power terminal 38. In addition, to prevent the feeding of a negative pulse to this grid, a rectifier 158 is connected between the input terminal 44 and the negative power terminal 38, and a second rectifier 160 between the upper end of the resistor 110 and ground.

Figure 3:
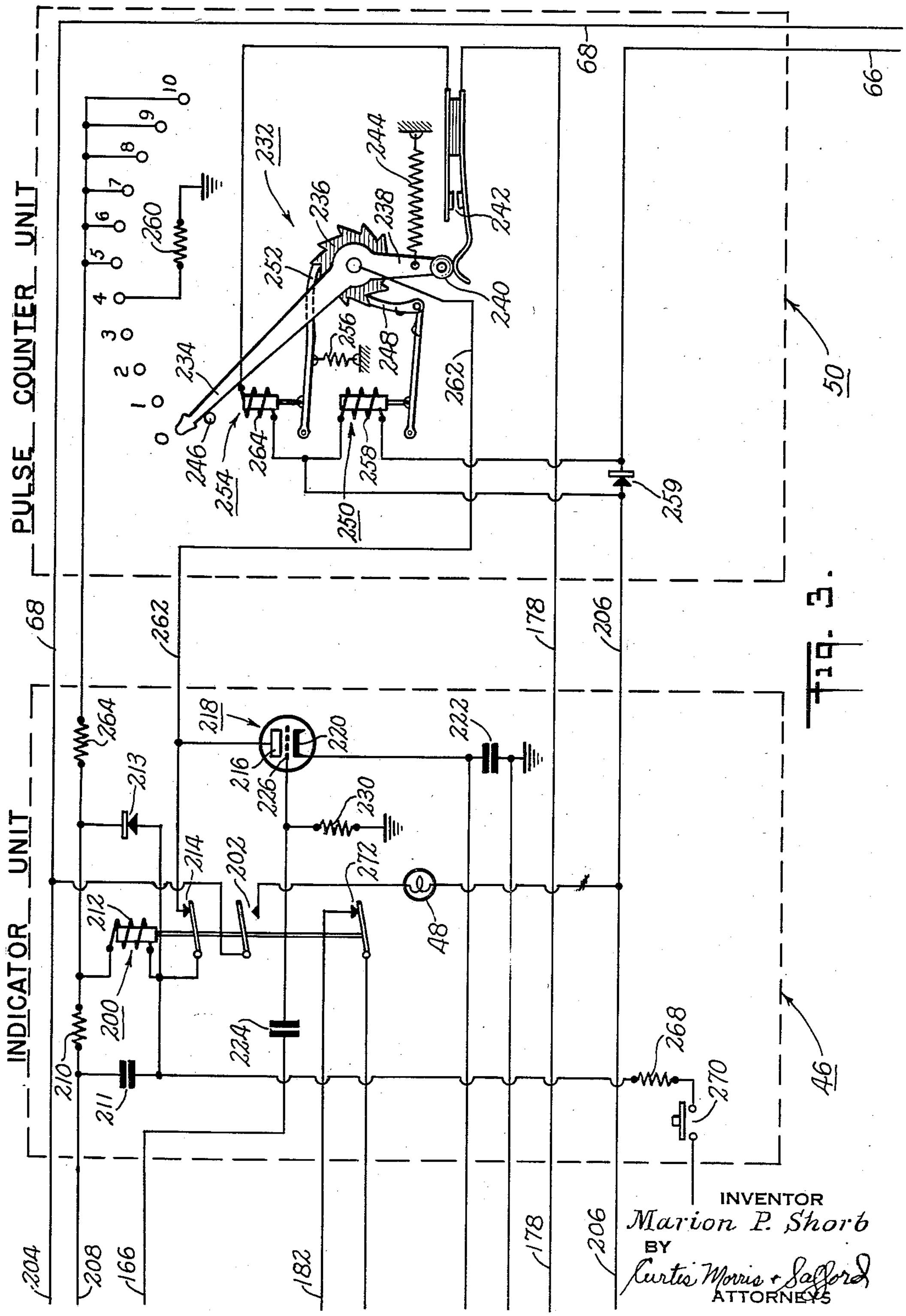
Figure 3 is a schematic diagram showing the circuit of the Indicator Unit and the Pulse Counter Unit, illustrated in block form in Figure 1.

Referring now to Figure 3, the indicator unit 46 includes a failure relay generally indicated at 200 which, whenever it is deenergized, completes an energizing circuit through a set of its contacts 202 to the warning lamp 48. The power for this circuit is provided by two D.-C. leads 204 and 206 which are connected (see Figure 2) to the power terminals 36 and 38 respectively. When the checking system is in standby condition, the failure relay 200 is energized by a circuit which may be traced from a positive high-voltage lead 208 (connected to terminal 404 of the power supply 402, Figure 5) through a resistor 210 and the relay winding 212, through a set of relay contacts 214 to the plate 216 of a control tube generally indicated at 218, and from the cathode 220 of this tube through a set of contacts 162 of the control relay 100 (Figure 2) to ground. A capacitor 211 is connected in parallel with the failure relay winding 212 and the resistor 210, and the relay winding also is paralleled by a rectifier 213, to assure stable operation of this relay.

When the control relay 100 is energized at the start of a recording operation (as explained above), its contacts 162 will open which action, by itself, would stop the flow of current through the control tube 218, deenergize the failure relay 200, and hence energize the warning lamp 48 to indicate equipment malfunction. However, the control relay contacts 162 are paralleled by a set of contacts 164 of the timing relay 122, and these contacts close at substantially the same instant that the control relay contacts 162 open. Therefore, the flow of current for maintaining the failure relay energized will continue through the timing relay contacts 164 for the duration of the timing pulse developed by the multi-vibrator circuit so that the warning lamp 48 cannot indicate equipment failure during this period. Since it is possible for the control relay contacts 162 to open a short instant before the timing relay contacts 164 close, these two sets of contacts also are paralleled by a capacitor 222 (Figure 3) which is arranged to maintain a flow of current through the control tube 218 during such a momentary break in the circuit.

At the termination of the multi-vibrator timing pulse the failure relay energizing circuit through the control tube 218 is broken immediately. For this purpose, the upper end of the timing relay winding 120 is connected through a lead 166 and a coupling capacitor 224 to the grid 226 of the control tube so that a sharp negative voltage pulse, of short duration, is transmitted directly to this grid to cut the tube off immediately upon reenergization of the timing relay. The timing relay winding 120 also is paralleled by a capacitor 168 to improve the shape of this negative pulse and to prevent the build-up of large voltages when the relay is deenergized. The grid 226 of the control tube is connected in the usual way through an input resistor 230 to ground.

After a short mechanical delay, the timing relay contacts 164 also open and break the failure relay energizing circuit through the control tube 218. As will be explained hereinbelow, if the recording machine and the checking system were functioning properly during the period of the timing pulse, an alternate energizing circuit for the failure relay will have been set up before the end of the timing pulse, so that the warning lamp 48 remains deenergized even though no current can flow through the control tube. However, if there has been any malfunction in the equipment, this alternate circuit will not be established and the opening of the timing relay contacts 164 or the sharp negative pulse at the end of the multi-vibrator timing pulse will cause the warning lamp to be energized and thereby indicate a failure in the equipment.

Figure 4:
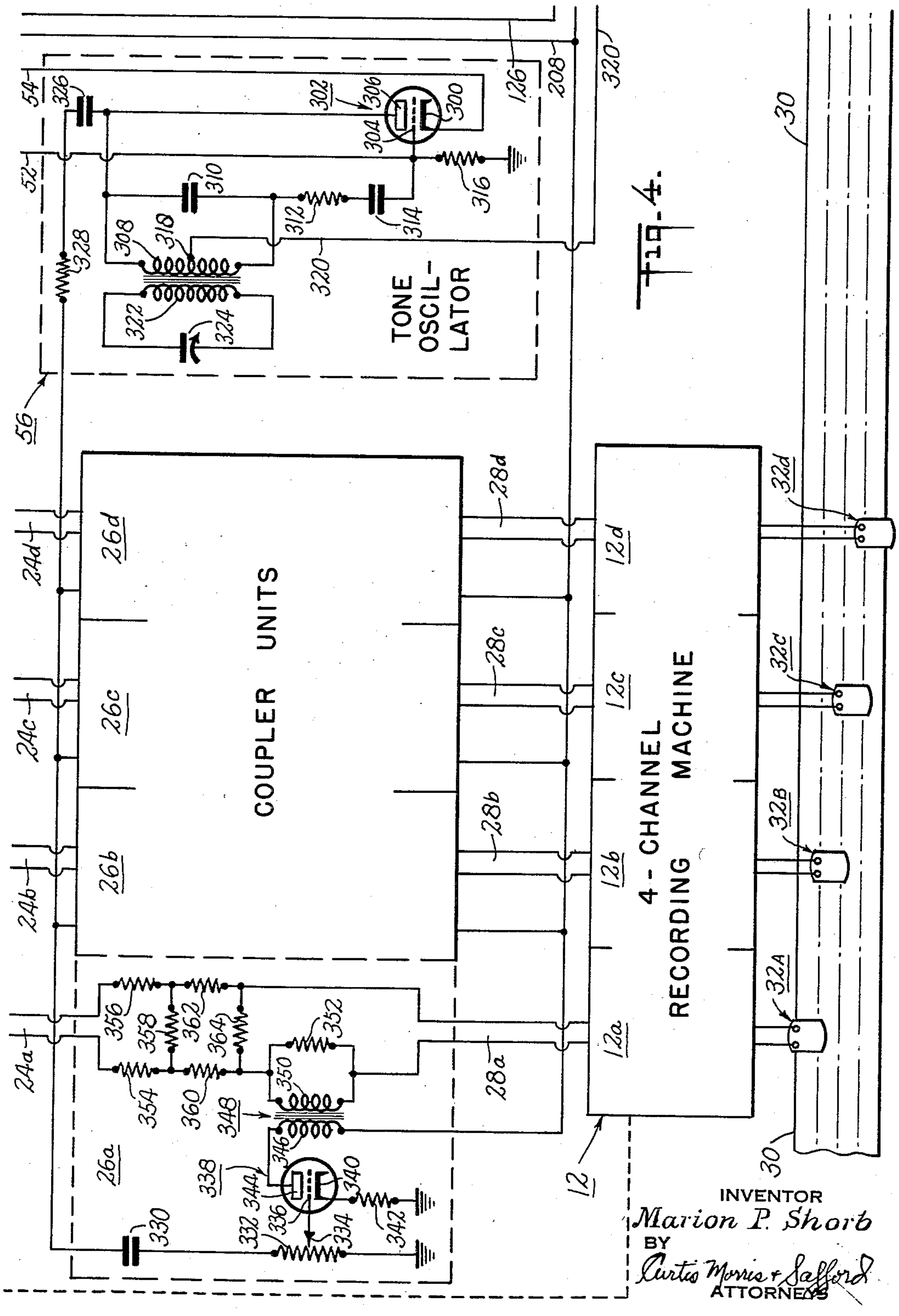
Figure 4 is a schematic diagram showing the circuit of the Tone Pulse Oscillator illustrated in block form in Figure 1.

Turning now to the portion of the system which serves to transmit a tone signal through the four-channel recording machine, the timing relay 122 includes a pair of contacts 170 and 172 which control the tone pulse oscillator 56 (Figure 4). When the timing relay is deenergized at the start of a timing pulse, contacts 170 close to complete a circuit from ground through the lead 54 to the cathode 300 (Figure 4) of a triode tube generally indicated at 302. At the same time, contacts 172 of the timing relay open to break a circuit from ground through the lead 52 to the grid 304 of this tube.

This tube 302 forms part of an oscillator arranged to produce a short (about 0.5 second) tone pulse having a frequency of about 2500 C. P. S. The plate 306 of this tube is connected through a resonant tank circuit comprising an inductive winding 308 in parallel with a tuning capacitor 310, and through a resistor 312 and a coupling capacitor 314 to the tube grid 304; an input resistor 316 also is connected between this grid and ground. The plate 306 is provided with positive energizing potential by a connection from a center-tap point 318 on the inductive winding 308 to a high-voltage lead 320 (connected to terminal 406 of the power supply 402, Figure 5). The inductive winding 308 also is coupled to a second winding 322 in parallel with an adjustable tuning capacitor 324 which together serve as a vernier tuning control of the oscillator frequency permitting the use of a capacitor of reasonable size.

When the timing relay 122 in the timer unit 34 is deenergized, the consequent operation of its contacts 170 and 172 conditions the tone oscillator 56 for operation by completing a circuit from the cathode 300 to ground, and also by removing a short circuit between the grid 304 and ground. The duration of the tone pulse produced by this oscillator is determined by the time constant of the feedback circuit comprising resistor 312 and capacitor 314. Once the oscillator has pulsed, it cannot again oscillate for approximately 8 seconds, a period which exceeds the duration (4.5 seconds) of the multi-vibrator timing pulse. Once the timing pulse is over, of course, the reenergization of the timing relay disables the tone oscillator so that no further signal can be produced.

The tone pulse produced by the oscillator 56 is coupled from the tube plate 306 through a cpacitor 326 and a resistor 328 to the four coupler units *26a*, *26b*, *26c*, *26d*, which in turn feed this pulse to the four separate recording machine channels *12a*, *12b*, *12c*, *12d*. These coupler units all are identical, and hence only one is shown and described in detail herein.

In the first coupler unit *26a*, the oscillator tone pulse is fed through a capacitor 330 to one end of a potentiometer 332, the other end of which is connected to ground. A portion of the pulse energy is picked off by the movable arm 334 of this potentiometer and fed directly to the grid 336 of a triode tube generally indicated at 338. The cathode 340 of this tube is connected through a resistor 342 to ground, while the plate 344 is connected through the primary winding 346 of an audio transformer 348 to the positive high-voltage lead 208. Consequently, the portion of the tone signal picked off by the movable arm 334 appears in amplified form in the transformer secondary winding 350 and a load resistor 352 connected in parallel with this winding.

The sound signals to be recorded (i. e. voice, etc.) are fed to the coupler unit 26*a* through the transmission lines 24*a*, and are attenuated by a balanced H-pad comprising resistors 354, 356, 358, 360 and 362. Bridged across the output of this pad is a resistor 364 which is connected in series with the tone pulse load resistor 354 and the input circuit of the recording channel 12*a*. Thus, the recorder head 32*a* connected to the output circuit of this channel receives sound signals from the source 22 as well as the tone pulses produced by the oscillator 56.

To summarize briefly, whenever the recording machine is energized, a tone pulse having a frequency of 2500 cycles per second is applied simultaneously to all four of the recorder heads 32*a*, 32*b*, 32*c* and 32*d*, thereby producing a series of four evenly spaced-apart impressions on the moving magnetic tape 30. This tone pulse is approximately 0.5 second in duration, but because it takes some finite time for the tape to accelerate to operating speed, the actual duration of each pulse impression on the tape will be slightly less than 0.5 second. The tape speed and the longitudinal spacing between the recorder heads are such that the tone pulse impressions are about 1 second apart on the tape.

The four consecutive tone pulses impressed on the tape 30 are sensed by the pick-up head 58 (Figure 5) and are fed along the pair of wires 60 and 62 to an amplifier input network comprising a capacitor 414 connected in parallel with a potentiometer 416 in series with a fixed resistor 418. The capacitor 414 serves to tune the inductance of the pick-up head to the tone pulse frequency, while the potentiometer serves as an adjustable gain control for the amplifier 64.

The portion of the tone pulse energy picked off by the movable arm 420 of the potentiometer 416 is fed through a resistor 422 to the control grid 424 of a pentode tube generally indicated at 426. The cathode 428 of this tube is connected to the suppressor grid 430, and also is connected through two resistors 432 and 434 to ground; the first of these resistors 432 is by-passed by a capacitor 436. The plate 438 of this tube is supplied with energizing potential through a load resistor 440, a lead 442, an isolating resistor 444, and a lead 446 which is connected to a positive terminal 408 of the rectifier power supply 402. The screen grid 448 of this tube is provided with energizing potential through a dropping resistor 450 connected to the lead 442; decoupling capacitors 452 and 454 are provided to assure stability of the D.-C. potentials.

The alternating signal appearing on the plate 438 of the pentode tube 426 is coupled through a capacitor 456 to the control grid 458 of a second pentode tube generally indicated at 460. The cathode 462 of this tube is connected through a bias resistor 464 in parallel with a by-pass capacitor 466 to ground and also is connected to the suppressor grid 468. An input resistor 470 is connected between the control grid 458 and ground, and the screen grid 472 is connected through a dropping resistor 474 to the high-voltage lead 442, with a decoupling capacitor 476 connected to ground.

The plate 478 of this tube 460 is supplied with energizing potential through a load resistor 480 connected to the high-voltage lead 442. The alternating signals on this plate are fed back through a coupling capacitor 482 and a resistor 484 to the cathode resistor 434 of the first stage 426. These signals also are fed through a capacitor 486 to the control grid 488 of a triode tube generally indicated at 490.

The control grid 488 and the cathode 492 of this latter tube 490 are connected to ground through respective resistors 494 and 496. The plate 498 of this tube is provided with energizing potential through a resonant tank circuit comprising an adjustable inductor 500 in parallel with a capacitor 502, the lower end of which is connected to the high-voltage lead 446. This tank circuit is adjusted to resonance at the frequency developed by the tone oscillator described with reference to Figure 3.

The tone pulses appearing on the plate 498 of the tube 490 are fed through a coupling capacitor 504 to the control grid 506 and plate 508 of a triode tube generally indicated at 510. A rectifier 512 is connected between the control grid 506 and ground and serves in conjunction with the coupling capacitor 504 to provide a voltage doubling effect. With the grid 506 connected to the plate 508, the tube 510 acts as a diode detector to feed the resulting double-amplitude positive signals to a capacitor 514 which is connected between the cathode 516 and ground. A resistor 518 is connected in parallel with this capacitor to discharge the capacitor during the one second time interval between pulses of audio-frequency signal.

With this arrangement, each audio-frequency tone signal detected by the tube 510 develops a corresponding positive pulse of voltage across the load resistor 518 and this pulse is fed to the control grid 520 of a pentode tube generally indicated at 522. The cathode 524 of this tube is connected to the suppressor grid 526 and, through a cathode resistor 528, to ground. The plate 530 of this tube is connected through the winding 532 of a keying relay generally indicated at 534, the other end of the relay winding being connected to the high-voltage lead 126; a capacitor 536 also is connected in parallel with the winding 532 of this relay. The screen grid 538 of the tube 522 is provided with energizing potential from the high-voltage lead 126 through a voltage dividing network comprising two series resistors 540 and 542.

In operation, when the control grid 520 of the tube 522 is driven positive by a pulse of voltage appearing across the load resistor 518, this tube conducts heavily through the winding 532 of the keying relay 534 and causes a set of relay contacts 544 to close. Thus, when the magnetic pick-up head 58 transmits to the tuned amplifier 64 a series of four audio-frequency tone pulses of proper frequency, intensity and duration, the contacts 544 of the keying relay will be closed and opened four successive times.

Referring now to the pulse counter unit 50 (Figure 3), this unit includes a stepping switch generally indicated at 232, and which may be of any conventional type such as manufactured by C. P. Clare & Co., of Chicago, Illinois, under Catalog No. DS-4. This stepping switch, shown only diagrammatically in the drawing, includes a rotatably driven switch arm 234 adapted to make electrical connection with any one of a series of spaced-apart contacts numbered 1, 2, 3, . . . 10. This switch arm is mounted on a toothed drive wheel 236 which also carries a reset arm 238 having at its remote end a small roller 240 operable to open a set of contacts 242 when the switch arm is in its "zero" position (as shown). A spring 244 is fastened to the reset arm to tend to rotate the switch arm counterclockwise and into engagement with a stop 246.

The peripheral teeth of the drive wheel 236 are engaged by a driving pawl 248 secured to the armature of a stepping relay generally indicated at 250, so that each time the relay is energized, the switch arm 234 is moved clockwise one step to make connection to the next one of the numbered contacts 1, 2, 3, etc. These drive wheel teeth also are engaged by a reset pawl 252 secured to the armature of a reset relay generally indicated at 254, and this pawl is urged into contact with the teeth by a small spring diagrammatically indicated at 256 so as normally to hold the switch arm in the farthest clockwise position to which it has been advanced by the stepping relay 250. Energization of the reset relay withdraws the pawl 252 from engagement with the drive wheel teeth to permit the drive wheel and the switch arm to be rotated counterclockwise in response to the urging of the spring 244.

Figure 5:
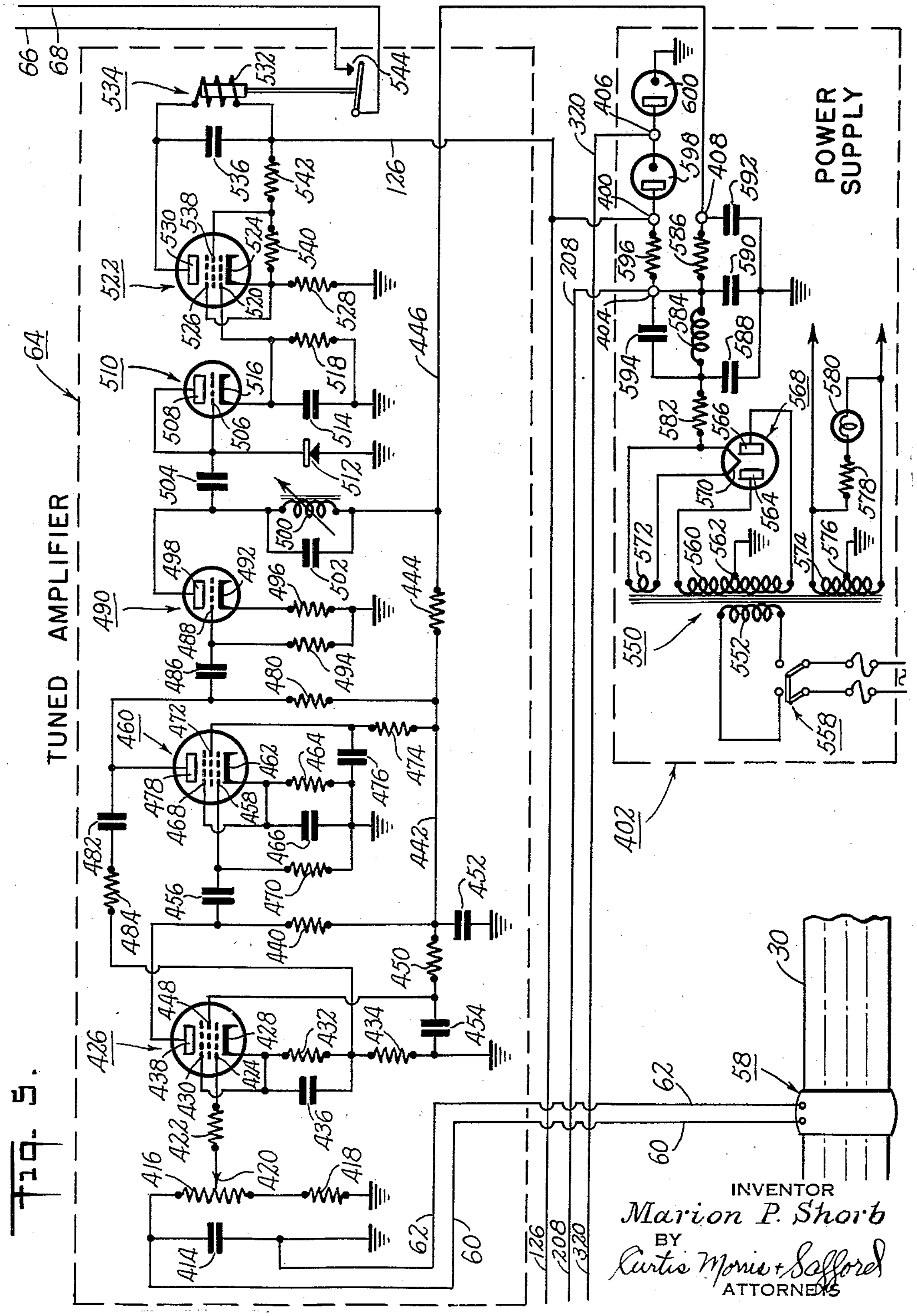
Figure 5 is a schematic diagram showing the circuit of the Tuned Amplifier illustrated in block form in Figure 1.

Reverting now to Figure 5, when the keying relay 534 is energized and its contacts 544 are closed, an energizing circuit is completed for the stepping relay 250 (Figure 3). This circuit may be traced from the negative power terminal 38 (Figure 2), along lead 206 (Figure 3), through the winding 258 of the stepping relay (which is paralleled by a rectifier 259), along lead 66 to contacts 544 of the keying relay, and back along leads 68 and 204 to the positive power terminal 36. When this energizing circuit is completed, the armature of the stepping relay is actuated to move the driving pawl 248 against the drive wheel 236 and thereby rotate the switch arm 234 clockwise to make electrical connection with the next adjacent contacts 1, 2, 3, etc. When the drive wheel has been rotated clockwise by the stepping relay, the reset pawl 252 drops into position to firmly engage the next adjacent tooth so as to restrain the drive wheel from returning to its original position.

Considering now the overall operation of this portion of the checking system, and referring first to Figure 5, when the magnetic pick-up head 58 senses on the moving magnetic tape 30 four consecutive sound impulses of proper frequency, amplitude and duration, the keying relay 534 will be energized once for each of these consecutive pulses. The contacts 544 of this relay consequently close and open four times to energize the stepping relay 250 (Figure 3) and advance the switch arm 234 four steps clockwise to make connection to contact number 4. When this occurs, a circuit is completed from ground through a resistor 260, contact number 4, the switch arm 234, and a lead 262 to the plate 216 of the control tube 218.

If the recording machine and the checking system are both operating properly, this connection from the plate 216 of the control tube 218 through the switch arm 234 to ground will be established before the end of the timing pulse produced by the timer unit 34. Therefore, when the timing relay 122 is reenergized at the end of the timing pulse and, as explained hereinabove, cuts off the flow of current through the control tube 218, an alternate path for this flow of current already is established through the switch arm 234 and the resistor 260 to ground. Accordingly, the failure relay 200 will remain energized, and the warning lamp 48 will remain deenergized.

At the end of a recording operation, the control relay 100 (Figure 2) will be deenergized and a set of its contacts 174 will close to complete an energizing circuit for the reset relay 254 (Figure 3) and return the switch arm 234 to its zero position. This relay energizing circuit may be traced from the positive power terminal 36 along a lead 176, through the control relay contacts 174, along a lead 178 to the contacts 242 (Figure 3), through the winding 264 of the reset relay, and back along lead 206 to the negative power terminal 38. Energization of the reset relay withdraws the pawl 252 from engagement with the drive wheel 236, and the switch arm 234 therefore rotates counterclockwise until it has reached the contact numbered zero and comes to rest against the stop 246. At this point, the contacts 242 are opened by the roller 240 so that the reset relay is deenergized and the stepping switch 232 is conditioned for the next checking operation.

If there is a failure in any one of the four recording channels in the recording machine 12, the keying relay 534 (Figure 5) will be energized less than four times and the switch arm 234 (Figure 3) will come to rest on one of the other contacts 1, 2 or 3. Since these contacts are electrically isolated from the checking system circuit, no alternate path will be established for the flow of energizing current through the failure relay 200 and the switch arm 234. Therefore, when the control tube 218 is cut off at the end of the timing pulse produced by the timer unit 34, the failure relay will be deenergized and its contacts 202 will close to energize the warning lamp 48 and indicate a fault in the recording equipment or checking system.

Under certain circumstances, the keying relay 534 may be energized more than the normal four times. For example, if the speed of the magnetic tape 30 is not constant, the frequency of the tone pulses sensed by the pick-up head 58 will vary. Because of the sharp resonant tuning of the amplifier 64, such a varying-frequency pulse may produce a double-peaked D.-C. voltage pulse in the output tube 510 of this amplifier, and cause the keying relay to be energized twice for a single pulse received from the magnetic pick-up head. In this event, the stepping switch arm 234 will be advanced beyond contact numbered 4 (e. g. to contacts numbered 5, 6, 7, etc.). This completes a circuit in shunt with the failure relay winding 212, through the switch arm and a resistor 264, and reduces the current flow through this relay to below that required to hold the relay in. Consequently, as soon as the stepping switch advances beyond contact number 4, the failure relay contacts 202 close to energize the warning lamp 48.

If the failure relay 200 is deenergized in any manner, it must be manually reset because its contacts 214, in series with the normal path for relay energizing current, open to break the power circuit. To reset the relay, a separate energizing circuit is provided from the lower end of the relay winding along a lead 266, through a resistor 268, across the contacts of a normally-open push-button switch 270, and through a set of contacts 180 of the timing relay 122 to ground. When the timing relay is energized (i. e. at all times except during the 4.5 second timing pulse produced by the timer unit 34), operation of the reset push-button 506 completes this separate energizing circuit for the failure relay. If the system is otherwise in working order, the failure relay will remain energized when the reset push-button 506 is released, since the energizing current for the failure relay then flows through the relay contacts 214 and the control tube 218.

The checking system is interlocked in such a manner that once the checking cycle has started, it will not be stopped if the start-stop switch 20 (Figure 2) is opened during the period of the timing pulse. For this purpose, the control relay 100 and the recording machine start relay 18 are energized through an alternate path which may be traced from the positive power terminal 36, along leads 204 and 182 to a set of contacts 272 of the failure relay 200 (Figure 3), through a set of contacts 184 of the timing relay 122 (Figure 2), and through the control relay winding 102 to the negative power terminal 38. At the end of the timing pulse, the timing relay 122 is reenergized and its contacts 184 open to break this alternate current path for the control and machine start relays.

Referring now to the rectifier power supply 402 (Figure 5), this unit includes a power transformer generally indicated at 550 having a primary winding 552 which is energized by an alternating-current power circuit including a master switch 558. A high-voltage secondary winding 560 is connected to ground at its center-tap point 562, and the remote ends of this winding are connected to the plates 564 and 566 of a full-wave rectifier tube generally indicated at 568. The filament 570 of this tube is energized by a small secondary winding 572 of the transformer 550, and an additional secondary winding 574 is provided for energizing the heaters of the various vacuum tubes used in the checking system. This latter winding 574 is provided with a center-tap 576 connected to ground, and the winding is shunted by a resistor 578 in series with an indicating lamp 580.

The filament 570 of the rectifier tube 568 is connected through a resistor 582 to a filter network comprising a series inductor 584 and resistor 586 with shunt capacitors 588, 590 and 592 connected to ground. The inductor 584 is paralleled by a capacitor 594, and a voltage-dividing circuit is connected to the right-hand junction of these two elements. This latter circuit comprises a series combination of a resistor 596 and two voltage regulator tubes 598 and 600.

Accordingly, it will be apparent that the checking system described hereinabove is well adapted to achieve the several objects of the present invention. In particular, the system is so arranged that equipment failure in the recording machine 12 from any one of a wide variety of causes will result in energization of the warning lamp 48 to indicate improper operation. This warning lamp may be illuminated due to tube failure in the amplifiers associated with the recording machine, failure of high-frequency bias used during magnetic recording, poor contact of the magnetic tape 30 with the recording heads 32, error in lateral positioning of the recorder heads 32, excessive delay in bringing the recording machine to operating speed, failure of the recording machine to start, or accidental disturbance of the gain or bias controls (not shown) on the front panel of the recording machine. In general, any fault which reduces the recording machine output signal or changes the speed of the machine will cause the warning lamp 48 to light.

The system also is arranged so that it is "self-checking," i. e. failure of tubes or components in the checking system itself will cause the warning lamp 48 to light. For example, if the stepping switch 232 should fail to reset, the next start of the recording machine 12 would cause the switch arm 232 to advance to contact number 5 and thereby shunt the winding of the failure relay 200 causing it to drop out and energize the warning lamp. If the first multi-vibrator tube 114 should lose emission, the multi-vibrator will not produce a timing pulse when the recording machine is turned on, and hence when the control relay 100 is energized, the opening of its contacts 162 will break the energizing circuit for the failure relay 200 thus causing the warning lamp to be lit.

If the second multi-vibrator tube 116 loses emission, the timing relay 122 will be deenergized so that the tone pulse oscillator 56 will continuously generate pulses every 8 seconds (approximately), and the recording machine 12 will run because the start relay 18 will be energized through the alternate circuit including contacts 272 of the failure relay 200. The result would be a continuous stepping of the stepping switch 232 until the switch arm 234 makes connection with one of the contacts beyond contact number 4, and this will shunt the failure relay 200 and accordingly energize the warning lamp 48. If the control relay 100 should fail, the stepping switch would reset after each pulse produced by the keying relay 534 and never reach contact number 4. Any loss of emission in the control tube 218 would cause the failure relay 200 to drop out and energize the warning lamp. Loss of emission in the tone pulse oscillator tube 302, or in the tubes of the coupler units 26, would reduce the amplitude of the pulse fed to the magnetic tape 30 and thereby cause the checking system to show failure.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. Apparatus for checking the operation of a recording machine of the type which includes a recording head to make impressions on a moving record in response to input variations and wherein said record subsequently is to be driven past a reproducing head to develop output variations in accordance with said impressions, comprising, in combination, an indicating device for warning of malfunction in said recording machine, signal-producing means for developing a fixed-frequency electrical signal of predetermined duration and suitable for recording by said machine, circuit means for transmitting said signal to the input of said recording macihne to make a corresponding impression on the moving record associated therewith, sensing means including a pick-up head cooperating with said moving record for producing a check signal in accordance with said corresponding impression, said sensing means being tuned to the frequency of said signal, and control means responsive to said check signal for controlling said indicating device.

2. Apparatus for checking the operation of a recording machine of the type which includes a recording head to make impressions on a moving record in response to input variations and wherein said record subsequently is to be driven past a reproducing head to develop output variations in accordance with said impressions, comprising, in combination, an indicating device for warning of malfunction in said recording machine, signal-producing means for developing a signal suitable for recording by said machine, transmission means for conveying said signal to the input of said recording machine to make a corresponding impression on the moving record associated therewith, sensing means including a pick-up head cooperating with said moving record for producing a check signal in accordance with said corresponding impression, said pick-up head being spaced a short distance from said recording head in the direction of movement of said record by said recording head, whereby said corresponding impression reaches said pick-up head a short time after said signal is impressed on said record, and control means responsive to said check signal for controlling said indicating device.

3. Apparatus for checking the operation of a recording machine of the type which includes a plurality of recording heads positioned to make impressions on a moving record in response to input variations and wherein said recording heads are laterally spaced-apart with respect to the direction of movement of said record so as to produce a series of side-by-side tracks of recorded material, comprising, in combination, an indicating device for warning of malfunction in said recording machine, signal-producing means for developing a tone-pulse signal suitable for recording by said machine, transmission means for conveying said signal to the input of said recording machine to make corresponding impressions on the side-by-side tracks of said moving record, means for establishing a longitudinal spacing between the individual impressions recorded on said tracks, sensing means cooperating with said moving record and responsive to recorded material on all of said tracks, said sensing means being adapted to produce a check signal in accordance with said corresponding impressions, and control means operable by said check signal for controlling said indicating device.

4. Apparatus for checking the operation of a recording machine of the type which includes a recording head to make impressions on a moving record in response to input variations and wherein said record subsequently is to be driven past a reproducing head to develop output variations in accordance with said impressions, comprising, in combination, a start-stop switch for said recording machine, an indicating device for warning of malfunction in said recording machine, signal-producing means for developing an audio-frequency tone signal suitable for recording by said machine, energizing means for activating said signal-producing means when said start-stop switch is placed in its "start" position, transmission means for conveying said tone signal to the input of said recording machine to make a corresponding tone impression on the moving record associated therewith, sensing means cooperating with said moving record for producing a check signal in accordance with said corresponding tone impression, and control means responsive to said check signal for controlling said indicating device.

5. Apparatus for checking the operation of a sound recording machine of the type adapted to make impressions on a moving record in accordance with input variations, comprising, in combination, means to produce an audio-frequency signal suitable for recording by said machine, transmission means for feeding said signal to the input of said machine to make a corresponding impression on the moving record associated with said machine, an indicator for warning of improper operation of said machine, timing means arranged to be actuated substantially at the time said signal is initiated to produce a timing pulse of predetermined duration, pick-up means associated with said record and adapted to produce a check signal in accordance with said corresponding impression, and control means responsive to said check signal and arranged to actuate said indicator if said check signal is not received during the period of said timing pulse.

6. Apparatus for checking the operation of a magnetic tape sound recording machine of the type having a recording head adapted to make magnetic impressions on a moving tape record in accordance with input variations, comprising, in combination, means to produce an audio-frequency signal suitable for recording by said machine, circuit means for transmitting said signal to the input of said machine to make a corresponding impression on the moving tape associated with said machine, an indicator for warning of improper operation of said machine, timing means arranged to be actuated substantially at the moment said signal is initiated to produce a timing pulse of predetermined duration, pick-up means associated with said tape and spaced from said recording head a fixed distance in the direction of movement of said tape, said pick-up means being adapted to produce a check signal in accordance with said corresponding impression, and control means responsive to said check signal and arranged to actuate said indicator if said check signal is not received during the period of said timing pulse.

7. Apparatus for checking the operation of a sound recording machine of the type adapted to make impressions on a moving record in accordance with input variations, comprising, in combination, an on-off control device for said machine, tone-pulse producing means to develop an audio-frequency signal suitable for recording by said machine, circuit means for activating said tone-pulse producing means in response to actuation of said on-off control device to its "on" position, transmission means for feeding said audio-frequency signal to the input of said machine to make a corresponding tone pulse impression on the moving record associated with said machine, an indicator for warning of improper operation of said machine, timing means arranged to be actuated substantially at the time said tone pulse signal is initiated to produce a timing pulse of predetermined duration, pick-up means associated with said record and adapted to produce a check signal in accordance with said corresponding impression, and control means responsive to said check signal and arranged to actuate said indicator if said check signal is not received during the period of said timing pulse.

8. Apparatus for checking the operation of a sound recording machine of the type adapted to make impressions on a moving record in accordance with input variations, comprising, in combination, an on-off control device for said machine, timing means arranged to be activated when said device is actuated to its "on" condition and to produce a timing pulse of predetermined duration, tone-pulse producing means for generating an audio-frequency tone signal of short duration suitable for recording by said machine, energizing means under the control of said timing means for activating said tone-pulse producing means at the start of said timing pulse, transmission means for feeding said tone signal to the input of said machine to make a corresponding tone impression on the moving record associated with said machine, pick-up means associated with said record and adapted to produce a check signal in accordance with said corresponding tone impression, an indicator for warning of improper operation of said machine, and control means responsive to said check signal and arranged to actuate said indicator if said check signal is not received during the period of said timing pulse.

9. Apparatus for checking the operation of a sound recording machine of the type adapted to make impressions on a moving record in accordance with input variations, comprising, in combination, an on-off switch device for said machine, timing means including a multivibrator arranged to be activated when said on-off switch device is actuated to its "on" position to produce a timing pulse of predetermined duration, an oscillator arranged to produce an audio-frequency tone pulse signal suitable for recording by said machine and having a duration substantially shorter than the duration of said timing pulse, means for activating said oscillator substantially at the start of said timing pulse, transmission means for feeding said tone signal to the input of said machine to make a corresponding tone pulse impression on the moving record associated with said machine, pick-up means associated with said record and adapted to produce a check signal in accordance with said corresponding tone pulse impression, an indicator for warning of improper operation of said machine, and control means responsive to said check signal and arranged to actuate said indicator if said check signal is not received during the period of said timing pulse.

10. Apparatus for checking the operation of a recording machine of the type which includes a plurality of recording heads positioned to make impressions on a moving tape record in response to input variations and wherein said recording heads are both laterally and longitudinally spaced apart with respect to the direction of movement of said record so as to produce a series of side-by-side tracks of recorded material, comprising, in combination, an indicating device for warning of malfunction in said recording machine, signal-producing means for developing a tone-pulse signal of fixed frequency suitable for recording by said machine, transmission means for conveying said signal to the input of said recording machine to make corresponding and simultaneous impressions on the side-by-side tracks of said moving record, said impressions being separated longitudinally with respect to said tape record in conformance with the longitudinal separation of said recording heads, sensing means cooperating with said moving record including a pick-up head extending across said record and responsive to recorded material on all of said tracks, said sensing means also including an amplifier tuned to the frequency of said tone-pulse signal and being adapted to produce a check signal comprising a series of consecutive pulses in accordance with said corresponding impressions, and control means operable by said check signal for controlling said indicating device.

11. Apparatus for checking the operation of a recording machine of the type which includes a plurality of recording heads positioned to make impressions on a moving record in response to input variations and wherein said recording heads are both laterally and longitudinally spaced apart with respect to the direction of movement of said record so as to produce a series of side-by-side tracks of recorded material, comprising, in combination, an indicating device for warning of malfunction in said recording machine, signal-producing means for developing a tone-pulse signal suitable for recording by said machine, transmission means for conveying said signal to the input of said recording machine to make corresponding impressions on the side-by-side tracks of said moving record, sensing means cooperating with said moving record and responsive to recorded material on all of said tracks, said sensing means being adapted to produce a check signal comprising a series of spaced-apart consecutive pulses in accordance with said corresponding impressions, and control means operable by said check signal for controlling said indicating device, said control means comprising stepping switch means responsive to said consecutive pulses and adapted to establish an electrical circuit for preventing said indicating device from displaying a warning of equipment malfunction when the number of said consecutive pulses is equal to the number of said recording heads.

12. Apparatus for checking the operation of a recording machine of the type which includes a plurality of recording heads positioned to make impressions on a moving record in response to input variations and wherein said recording heads are both laterally and longitudinally spaced apart with respect to the direction of movement of said record so as to produce a series of side-by-side tracks of recorded material, comprising, in combination, an indicating device for warning of malfunction in said recording machine, signal-producing means for developing a tone-pulse signal suitable for recording by said machine, transmission means for conveying said signal to the input of said recording machine to make corresponding impressions on the side-by-side tracks of said moving record, timing means for producing a timing pulse of predetermined duration substantially longer than said tone-pulse signal, circuit means for activating said timing means substantially at the start of said tone-pulse signal, sensing means cooperating with said moving record and responsive to recorded material on all of said tracks, said sensing means being adapted to produce a check signal comprising a series of consecutive pulses in accordance with said corresponding impressions, and control means operable by said check signal for activating said indicating device to display a warning of equipment malfunction if the number of said consecutive pulses received during said timing pulse is not equal to the number of said recording heads.

13. Apparatus for checking the operation of a recording machine of the type which includes a plurality of recording heads positioned to make impressions on a moving record in response to input variations and wherein said recording heads are both laterally and longitudinally spaced apart with respect to the direction of movement of said record so as to produce a series of side-by-side tracks of recorded material, comprising, in combination, an indicating device for warning of malfunction in said recording machine, signal-producing means for developing a tone-pulse signal suitable for recording by said machine, transmission means for conveying said signal to the input of said recording machine to make corresponding impressions on the side-by-side tracks of said moving record, timing means for producing a timing pulse of predetermined duration substantially longer than said tone-pulse signal, circuit means for activating said timing means substantially at the start of said tone-pulse signal, sensing means cooperating with said moving record and responsive to recorded material on all of said tracks, said sensing means being adapted to produce a check signal comprising a series of consecutive pulses in accordance with said corresponding impressions, and control means operable by said check signal for controlling said indicating device, said control means including a pulse-counting device arranged to establish an electrical circuit for conditioning said indicating device to indicate non-failure of equipment when the number of said consecutive pulses received during said timing pulse is equal to the number of said recording heads.

14. Apparatus for checking the operation of a recording machine of the type which includes a plurality of recording heads positioned to make impressions on a moving record in response to input variations and wherein said recording heads are both laterally and longitudinally spaced apart with respect to the direction of movement of said record so as to produce a series of side-by-side tracks of recorded material, comprising, in combination, an indicating device for warning of malfunction in said recording machine, a control circuit for said indicating device, signal-producing means for developing a tone-pulse signal suitable for recording by said machine, transmission means for conveying said signal to the input of said recording machine to make corresponding impressions on the side-by-side tracks of said moving record, timing means for producing a timing pulse of predetermined duration substantially longer than said tone-pulse signal, circuit means for activating said timing means substantially at the start of said tone-pulse signal, second circuit means under the control of said timing means and connected to said control circuit to maintain said indicating device inactivated during said timing pulse, sensing means cooperating with said moving record and responsive to recorded material on all of said tracks, said sensing means being adapted to produce a check signal comprising a series of consecutive pulses in accordance with said corresponding impressions, and control means including a pulse-counting device operable by said check signal to establish an electrical circuit to said control circuit to maintain said indicating device inactivated after said timing pulse only if the number of said consecutive pulses received during said timing pulse is equal to the number of said recording heads.

15. Apparatus for checking the operation of a sound recording machine of the type adapted to make impressions on a moving record in accordance with input variations, comprising, in combination, means to produce an audio-frequency signal suitable for recording by said machine, transmission means for feeding said signal to the input of said machine to make a corresponding impression on the moving record associated with said machine, an indicator having "safe" and "failure" conditions for warning of improper operation of said machine, a control circuit for said indicator, timing means arranged to be actuated substantially at the time said signal is initiated to produce a timing pulse of predetermined duration, circuit means under the control of said timing means and connected to said control circuit to normally maintain said indicator in its "safe" condition during said timing pulse, pick-up means associated with said record and adapted to produce a check signal in accordance with said corresponding impression, and control means responsive to said check signal and connected to said control circuit to actuate said indicator to its "failure" condition at the end of said timing pulse if said check signal is not received during the period of said timing pulse.

16. Apparatus for checking the operation of a sound recording machine of the type adapted to make impressions on a moving record in accordance with input variations, comprising, in combination, means to produce an audio-frequency signal suitable for recording by said machine, transmission means for feeding said signal to the input of said machine to make a corresponding impression on the moving record associated with said machine, an indicator having "safe" and "failure" conditions for warning of improper operation of said machine, a control circuit for said indicator, timing means arranged to be actuated substantially at the time said signal is initiated to produce a timing pulse of predetermined duration, first circuit means under the control of said timing means and connected to said control circuit to normally maintain said indicator in its "safe" condition during said timing pulse, second circuit means under the control of said timing means and connected to said control circuit to normally activate said indicator to its "failure" condition at the termination of said timing pulse, pick-up means associated with said record and adapted to produce a check signal in accordance with said corresponding impression, and control means responsive to said check signal and arranged to by-pass said second circuit means if said check signal is received during said timing pulse, whereby said indicator will remain in its "safe" condition at the termination of said timing pulse.

17. Apparatus for checking the operation of a sound recording machine of the type adapted to make impressions on a moving record in accordance with input variations, comprising, in combination, means to produce an audio-frequency signal suitable for recording by said machine, transmission means for feeding said signal to the input of said machine to make a corresponding impression on the moving record associated with said machine, an indicator having "safe" and "failure" conditions for warning of improper operation of said machine, a control circuit for said indicator, relay means forming part of said control circuit and adapted when energized to condition said control circuit to maintain said indicator in its "safe" condition, timing means arranged to be actuated substantially at the time said signal is initiated to produce a timing pulse of predetermined duration, first circuit means under the control of said timing means and arranged to establish a first energizing circuit for said relay means prior to the start of said timing pulse, said first circuit means being deactivated to interrupt said first energizing circuit following the start of said timing pulse, second circuit means under the control of said timing means and arranged to establish a second energizing circuit for said relay means only during said timing pulse, pick-up means associated with said record and adapted to produce a check signal in accordance with said corresponding impression, and control means responsive to said check signal and arranged to establish a third energizing circuit for said relay means if said check signal is received thereby during said timing pulse, whereby said relay remains actuated and said indicator remains in its "safe" condition.

18. Apparatus for checking the operation of a sound recording machine of the type adapted to make impressions on a moving record in accordance with input variations, comprising, in combination, means to produce an audio-frequency signal suitable for recording by said machine, transmission means for feeding said signal to the input of said machine to make a corresponding impression on the moving record associated with said machine, an indicator having "safe" and "failure" conditions for warning of improper operation of said machine, a control circuit for said indicator and adapted when energized to maintain said indicator in its "safe" condition, an electronic switching device for said control circuit and adapted when activated to interrupt the energization for said control circuit, timing means arranged to be actuated substantially at the time said signal is initiated to produce a timing pulse of predetermined duration, circuit means under the control of said timing means and adapted to activate said electronic switching device at the termination of said timing pulse and thereby to de-energize said control circuit, pick-up means associated with said record and adapted to produce a check signal in accordance with said corresponding impression, and control means responsive to said check signal and arranged to establish an auxiliary energizing circuit for said control circuit if said check signal is received during said timing pulse, whereby said control circuit will remain energized and said indicator will remain in its "safe" condition.

19. Apparatus for checking the operation of a sound recording machine of the type adapted to make impressions on a moving record in accordance with input variations, comprising, in combination, an on-off switch for said machine, means to produce an audio-frequency signal suitable for recording by said machine when said switch is actuated to its "on" position, transmission means for feeding said signal to the input of said machine to make a corresponding impression on the moving record associated with said machine, an indicator having "safe" and "failure" conditions for warning of improper operation of said machine, a control circuit for said indicator and adapted when energized to maintain said indicator in its "safe" condition, first and second energizing circuits for said control circuit, first circuit means under the control of said on-off switch to interrupt said first energizing circuit when said switch is actuated to its "on" position, timing means arranged to be actuated substantially at the time said signal is initiated to produce a timing pulse of predetermined duration, second circuit means under the control of said timing means to complete said said second energizing circuit during said timing pulse to maintain said indicator in its "safe" condition, pick-up means associated with said record and adapted to produce a check signal in accordance with said corresponding impression, and control means responsive to said check signal and arranged to establish an auxiliary energizing circuit for said control circuit if said check signal is received during said timing pulse, whereby said control circuit will remain energized and said indicator will remain in its "safe" condition.

20. Apparatus for checking the operation of a sound recording machine of the type adapted to make impressions on a moving record in accordance with input variations, comprising, in combination, on-off switch means for said machine, tone-pulse producing means for generating an audio-frequency signal suitable for recording by said machine, circuit means for energizing said tone-pulse means when said on-off switch means is placed in "on" position, transmission means for feeding said signal to the input of said machine to make a corresponding impression on the moving record associated with said machine, an indicator for warning of improper operation of said machine, timing means arranged to be actuated substantially at the time said signal is initiated to produce a timing pulse of predetermined duration, pick-up means associated with said record and adapted to produce a check signal in accordance with said corresponding impression, control means responsive to said check signal and arranged to actuate said indicator if said check signal is not received during the period of said timing pulse, and interlock means associated with said timing means to by-pass said on-off switch means and maintain said machine activated during said timing pulse.

21. Apparatus for checking the operation of a sound recording machine of the type adapted to make impressions on a moving record in accordance with input variations, comprising, in combination, an on-off control device for said machine, tone-pulse producing means to develop an audio-frequency signal suitable for recording by said machine, circuit means for activating said tone-pulse producing means in response to actuation of said on-off control device to its "on" position, transmission means for feeding said audio-frequency signal to the input of said machine to make a corresponding tone pulse impression on the moving record associated with said machine, an indicator having "safe" and "failure" conditions for warning of improper operation of said machine, a control circuit for said indicator and arranged when energized to maintain said indicator in its "safe" condition, timing means arranged to be actuated substantially at the time said tone pulse signal is initiated to produce a timing pulse of predetermined duration, pick-up means associated with said record and adapted to produce a check signal in accordance with said corresponding impression, control means responsive to said check signal and arranged to deenergize said control circuit if said check signal is not received during the period of said timing pulse, circuit means associated with said control circuit to interrupt said control circuit when it has been deenergized so as normally to prevent reenergization of said control circuit, and manually-operable reset means connected to said control circuit to permit said circuit to be reactivated and thereby to restore said indicator to its "safe" condition.

22. Apparatus for checking the operation of a sound recording machine of the type adapted to make impressions on a moving record in accordance with input variations, comprising, in combination, an on-off control device for said machine, a tone-pulse oscillator to develop an audio-frequency signal suitable for recording by said machine, circuit means for activating said oscillator in response to actuation of said on-off control device to its "on" position, transmission means for feeding said audio-frequency tone signal to the input of said machine to make a corresponding tone pulse impression on the moving record associated with said machine, an indicator for warning of improper operation of said machine, timing means arranged to be actuated substantially at the time said tone pulse signal is initiated to produce a timing pulse of predetermined duration, pick-up means associated with said record and adapted to produce a check signal in accordance with said corresponding impression, control means responsive to said check signal and arranged to actuate said indicator if said check signal is not received during the period of said timing pulse, and means associated with said oscillator for assuring that only a single tone pulse is produced during said timing pulse.

23. Apparatus for checking the operation of a recording machine of the type which includes a plurality of recording heads positioned to make impressions on a moving record in response to input variations and wherein said recording heads are both laterally and longitudinally spaced apart with respect to the direction of movement of said record so as to produce a series of side-by-side tracks of recorded material, comprising, in combination, an indicating device having "safe" and "failure" conditions for warning of malfunction in said recording machine, a control circuit for said indicating device and adapted when energized to maintain said device in its "safe" condition, signal-producing means for developing a tone-pulse signal suitable for recording by said machine, transmission means for conveying said signal to the input of said recording machine to make corresponding simultaneous impressions on the side-by-side tracks of said moving record, sensing means cooperating with said moving record and responsive to recorded material on all of said tracks, said sensing means being adapted to produce a check signal comprising a series of spaced-apart consecutive pulses in accordance with said corresponding impressions, and a stepping switch responsive to said check signal and including a movable member adapted to make connection to any one of a series of separate contacts in accordance with the number of consecutive pulses received, said stepping switch being arranged to deenergize said control circuit if the number of said consecutive pulses is greater than the number of said recording heads, whereby said indicating device will be placed in its "failure" condition.

24. Apparatus for checking the operation of a recording machine of the type which includes a recording head arranged to make impressions on a moving record in response to input variations and wherein said record subsequently is to be driven past a reproducing head to develop output variations in accordance with said impressions, comprising, in combination, an indicating device for warning of malfunction in said recording machine, signal-producing means for developing a test signal suitable for recording by said machine, electrical switch means, circuit means operable by said switch means and arranged to activate said signal producing means so as to automatically develop a test signal of predetermined character each time said switch means is actuated, transmission means for conveying said test signal to the input of said recording machine to make a corresponding impression on the moving record associated therewith, sensing means cooperating with said moving record for producing a check signal in accordance with said corresponding impression, and control means responsive to said check signal for controlling said indicating device.

25. Apparatus for checking the operation of a recording machine of the type which includes a recording head arranged to make impressions on a moving record in response to input variations and wherein said record subsequently is to be driven past a reproducing head to develop output variations in accordance with said impressions, comprising, in combination, an indicating device for warning of malfunction in said recording machine, signal-producing means for developing a varying signal suitable for recording by said machine, timing means associated with said signal producing means for automatically creating a timing signal a fixed time duration after the activation of said signal producing means, transmission means for conveying said varying signal to the input of said recording machine to make a corresponding impression on the moving record associated therewith, sensing means cooperating with said moving record for producing a check signal in accordance with said corresponding impression, and control means responsive to said check signal and to said timing signal for controlling said indicating device so as to produce an indication of malfunction if said check signal is not received in predetermined form prior to the receipt of said timing signal.

No references cited.